W. M. CONGER.

Children's Table Tray.

No. 9,304. Reissued July 20, 1880.

*Witnesses:*

Henry Eichling,

Geo. H. Smith.

*Inventor:*

Walter M. Conger.

UNITED STATES PATENT OFFICE.

WALTER M. CONGER, OF NEWARK, NEW JERSEY.

CHILD'S TABLE-TRAY.

SPECIFICATION forming part of Reissued Letters Patent No. 9,304, dated July 20, 1880.

Original No. 123,332, dated February 6, 1872. Application for reissue filed March 26, 1880.

*To all whom it may concern:*

Be it known that I, WALTER M. CONGER, of the city of Newark, in the county of Essex and State of New Jersey, have invented a new and useful Improvement in Children's Table-Trays, of which the following is a specification.

Children's table-trays constructed with the front edge turned down, forming a hanging lip to bear against the edge of the table, and with the other edges turned up to form a rim, have been largely made and used. This construction was patented to Nathaniel Waterman, May 12, 1863. An improvement on the Waterman tray was patented to Alexander Turner, May 11, 1869, which consisted in a tray provided with a rim extending entirely around it, but of less height upon its front edge than upon its sides and back. In this last construction separate stops were attached near the front corners of the tray to keep it in place on the table.

In the construction above referred to there was nothing to prevent the child from lifting up the front part of the tray until the hanging lip or the stops, as the case might be, cleared the top of the table, and then pushing the tray forward out of place.

It is the design of the present invention to remedy this defect by attaching spring-clips to the bottom or sides of the tray near its front corners, which shall embrace the edge of and extend underneath the table, and thus prevent the tray from being lifted out of contact with the table unless it is first drawn forward the length of the springs.

A second feature of the invention relates to the making a tray of the character hereinafter described when formed from a single piece of sheet metal.

Figure 1:
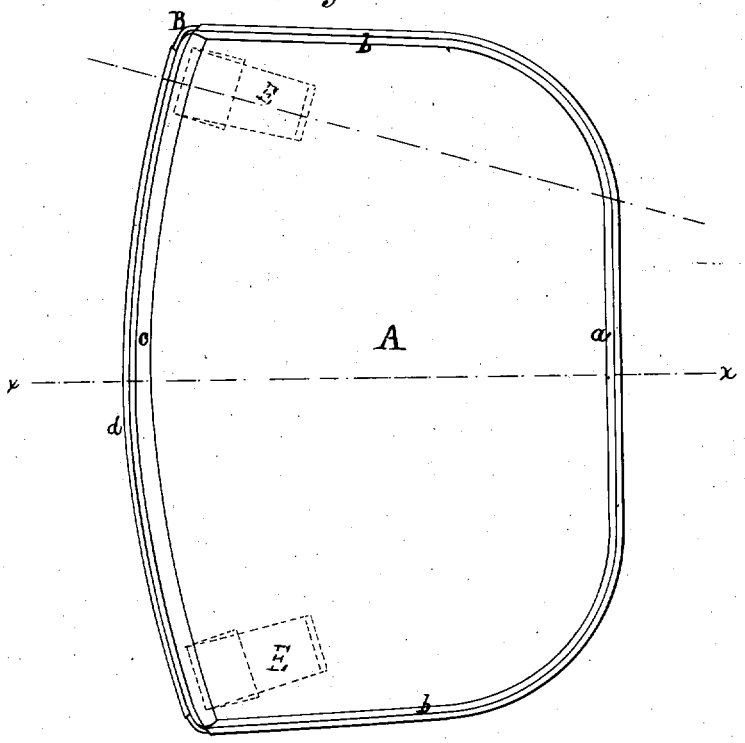
Figure 2:
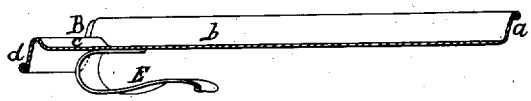
Figure 3:
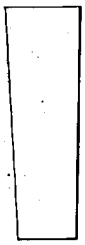
Figure 4:
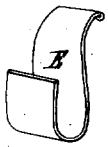
Figure 5:
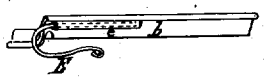

In the accompanying drawings, forming part of this specification, Figure 1 is a plan view of the tray. Fig. 2 is a vertical section through the line *x x* of Fig. 1. Fig. 3 represents a blank from which the springs can be conveniently made. Fig. 4 represents one of the spring-clips bent into proper shape to be applied to the bottom of the tray; and Fig. 5 shows the springs applied to the sides of the tray.

In the drawings, A represents a sheet of metal from which the body of the tray is made, the edges of the sheet upon three of its sides being turned up, in the process of making the tray, to form the back rim, *a*, and the side rims, *b b*, as indicated in the drawings.

The elevation or rim near the front edge of the tray (designated by *c*) is formed by bending the sheet metal upward and forward and then downward, thus forming a broad smoothly-rounded bead, which is preferably of less height than the side and back rims. This form of rim gives increased strength and stiffness to the body of the tray, and is well adapted to receive the pressure of the child's breast and arms without injuring them. From the base of the bead or rim *c* the metal is extended downward below the bottom of the tray to form a hanging lip, *d*. The metal should be so shaped by dies or otherwise that when it is bent up, as indicated, to form the front rim, *c*, it shall fit closely against the side rims, *b b*, to form a tight joint. If necessary, solder may be applied at these points to strengthen the joints and make them more secure.

E E represent springs or clips secured to the bottom of the tray, one near each front corner thereof. They are made of any suitable material, conveniently by cutting sheet metal of the desired elasticity into the form substantially as shown in Fig. 3, and then bringing them into the shape substantially as represented, to embrace the edge of the table and extend underneath the same to hold the tray upon it. Preferably they are attached to the tray at such an angle that they shall converge—that is, their free ends be nearer each other than the bends which embrace the edge of the table. This method of attachment gives them a stronger hold on the under side of the table, and better adapts them for use on tables of curved on circular shape.

Instead of applying the springs to the bottom of the trays, as heretofore described, and shown in Fig. 1, they may be inserted in sockets *e e*, formed on the outside of the rims *b b*, near the front corners of the tray. In this case the springs can be made of round wire and inserted into cylindrical sockets, as represented in Fig. 5, and can then be turned out of the way when not in use.

The spring-clips, whether applied to the sides or the bottom of the tray, should preferably have their free ends in such relation to the bottom of the tray, and should preferably have sufficient elasticity to clamp the tray upon the table when in position. The extreme ends of the spring-clips should present a smooth rounded surface, to prevent injury to the table-cloth.

It is readily seen that the use of springs, whether applied to the bottom or sides of the tray, as described, affords a far more effective way of securing the tray to the table than the devices heretofore used for this purpose, inasmuch as they prevent the tray from being easily lifted up out of its position, and, in addition, the head or bend of the springs furnishes a stop which prevents the tray from being pushed forward upon the table.

What is claimed as new is—

1. A child's table-tray provided with spring-clips attached to the bottom of the tray near its front corners and adapted to extend under the edge of the table, substantially as and for the purpose described.

2. A child's table-tray provided with spring-clips attached to the side rims near the front corners of the tray, substantially as and for the purpose described.

3. A child's table-tray made from a single piece of sheet metal and having its side and back rims formed by turning up the edges of the sheet and its front rim formed by bending the metal upward and then downward to make a broad smooth bead, substantially as and for the purpose set forth.

4. A child's table-tray made from a single piece of sheet metal, substantially as described, and having a continuous wire extending along the edges of the rims, and the hanging lip, substantially as described and shown.

WALTER M. CONGER.

Witnesses:
BENJ. A. SMITH,
ROBT. H. DUNCAN.